United States Patent
Wagner

(10) Patent No.: US 12,208,686 B2
(45) Date of Patent: Jan. 28, 2025

(54) METHOD FOR GENERATING AND OUTPUTTING GRAPHICAL INFO OBJECTS ON A GRAPHICAL USER INTERFACE

(71) Applicant: Volkswagen Aktiengesellschaft, Wolfsburg (DE)

(72) Inventor: Volkmar Wagner, Berlin (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 372 days.

(21) Appl. No.: 17/773,916

(22) PCT Filed: Oct. 26, 2020

(86) PCT No.: PCT/EP2020/080081
§ 371 (c)(1),
(2) Date: May 3, 2022

(87) PCT Pub. No.: WO2021/099067
PCT Pub. Date: May 27, 2021

(65) Prior Publication Data
US 2022/0363131 A1   Nov. 17, 2022

(30) Foreign Application Priority Data
Nov. 18, 2019   (DE) .................. 10 2019 217 733.6

(51) Int. Cl.
*B60K 35/00*   (2024.01)
*B60K 35/10*   (2024.01)
(Continued)

(52) U.S. Cl.
CPC ............. *B60K 35/00* (2013.01); *B60K 35/10* (2024.01); *B60K 35/28* (2024.01); *B60K 35/29* (2024.01);
(Continued)

(58) Field of Classification Search
CPC ........ B60K 35/00; B60K 35/28; B60K 35/29; B60K 35/10; B60K 2360/186; B60K 2360/119
(Continued)

(56) References Cited

U.S. PATENT DOCUMENTS 9,457,665 B1   10/2016   Boss et al.
9,469,195 B1 *  10/2016   Boss .................... B60K 35/00
(Continued)

FOREIGN PATENT DOCUMENTS

CN   109890646 A   6/2019   ............ B60K 35/10
DE   102011116120 A1   4/2013   ............ B60R 16/02
(Continued)

OTHER PUBLICATIONS

German Office Action, Application No. 102019217733.6, 7 pages, Aug. 25, 2020.
(Continued)

*Primary Examiner* — Richard A Goldman
(74) *Attorney, Agent, or Firm* — Slayden Grubert Beard PLLC

(57) ABSTRACT

Disclosed is a method for operating an operating system in a vehicle, wherein display data of a graphical user interface comprising at least one first display region are generated and output. The graphical user interface comprises a basic state and an info state. Context data about a current context of the vehicle are recorded and a first relevance value is determined for a first info application based on the recorded context data. The info state is activated depending on the determined first relevance value of the first info application, wherein, when the info state is activated, the first display region is reduced in size such that an info region is formed and a graphical info object is generated using the first info application and output in the info region.

15 Claims, 6 Drawing Sheets

(51) Int. Cl.
*B60K 35/28* (2024.01)
*B60K 35/29* (2024.01)

(52) U.S. Cl.
CPC ... *B60K 2360/119* (2024.01); *B60K 2360/186* (2024.01)

(58) Field of Classification Search
USPC .......................................................... 701/36
See application file for complete search history.

(56) References Cited

U.S. PATENT DOCUMENTS

| | | | |
|---|---|---|---|
| 10,051,103 B1 | 8/2018 | Gordon et al. | |
| 2002/0085043 A1 | 7/2002 | Ribak | 715/810 |
| 2003/0169902 A1* | 9/2003 | Satoh | G08G 1/166 |
| | | | 348/E7.086 |
| 2012/0105643 A1* | 5/2012 | Ozaki | G08G 1/168 |
| | | | 348/148 |
| 2013/0116859 A1* | 5/2013 | Ihlenburg | B60W 10/18 |
| | | | 701/1 |
| 2014/0303839 A1 | 10/2014 | Filev et al. | 701/36 |
| 2014/0304635 A1 | 10/2014 | Kristinsson et al. | 715/771 |
| 2015/0127626 A1* | 5/2015 | Park | G06F 16/7837 |
| | | | 707/706 |
| 2015/0177956 A1* | 6/2015 | Han | B60K 35/60 |
| | | | 715/771 |
| 2015/0346914 A1* | 12/2015 | Ebi | G06T 11/206 |
| | | | 715/781 |
| 2016/0029021 A1* | 1/2016 | Iwata | H04N 19/159 |
| | | | 382/233 |
| 2016/0085728 A1* | 3/2016 | Takada | G06F 40/103 |
| | | | 715/204 |
| 2016/0328244 A1* | 11/2016 | Ahmed | G06F 3/04886 |
| 2017/0136876 A1 | 5/2017 | Boss et al. | 701/36 |
| 2017/0199714 A1* | 7/2017 | Kim | G09G 3/006 |
| 2017/0272702 A1* | 9/2017 | Ozawa | H04N 7/181 |
| 2019/0369940 A1* | 12/2019 | Song | G09G 5/14 |
| 2020/0055396 A1 | 2/2020 | Mejia Gonzalez et al. | |
| 2021/0365731 A1* | 11/2021 | Takahashi | G06N 20/00 |
| 2022/0396149 A1* | 12/2022 | Yamafuji | G01C 21/3676 |
| 2023/0036783 A1* | 2/2023 | Sakuma | G02B 27/0101 |
| 2024/0042836 A1* | 2/2024 | Iwamoto | B60J 3/04 |

FOREIGN PATENT DOCUMENTS

| | | | | |
|---|---|---|---|---|
| DE | 102019217733 A1 | 5/2021 | ............ | B60R 16/02 |
| EP | 2930603 A1 | 10/2015 | ............ | G06F 3/0482 |
| EP | 3092559 A1 | 6/2019 | ............ | G06F 9/451 |
| WO | 2021/099067 A1 | 5/2021 | ............ | B60K 37/06 |

OTHER PUBLICATIONS

International Search Report and Written Opinion, Application No. PCT/EP2020/080081, 10 pages, Jan. 27, 2021.
Chinese Office Action, Application No. 202080079912.6, 18 pages.

* cited by examiner

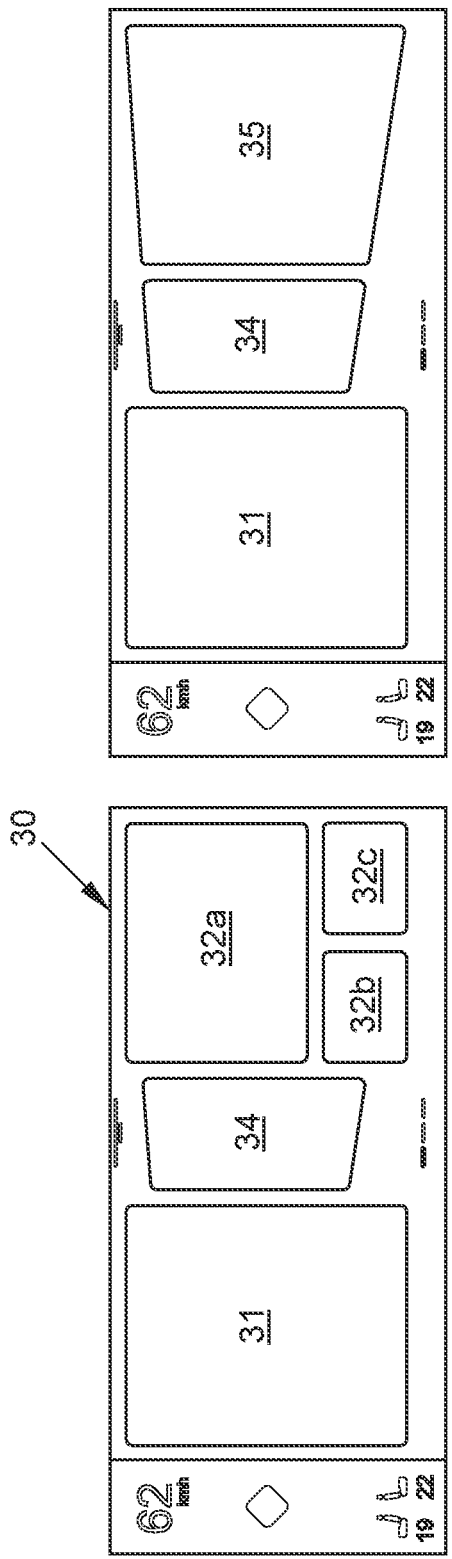
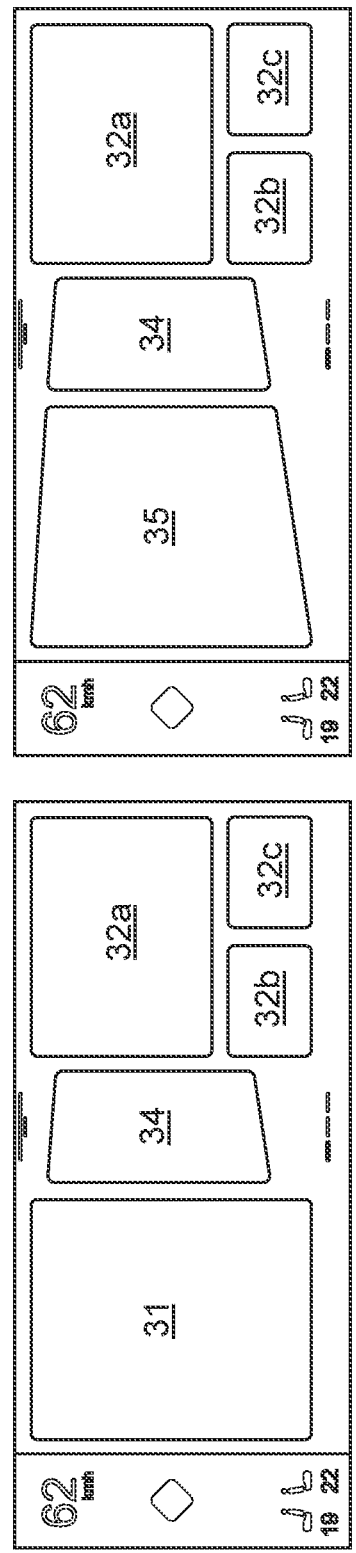
FIG. 3C
FIG. 3D
FIG. 3E
FIG. 3F

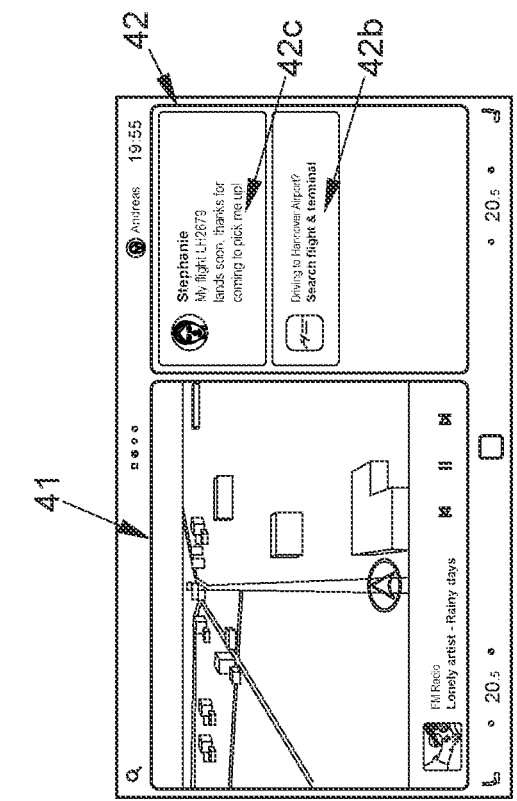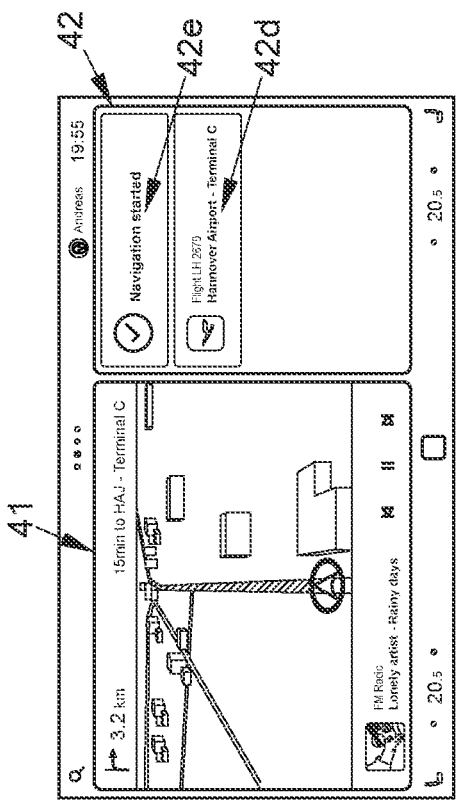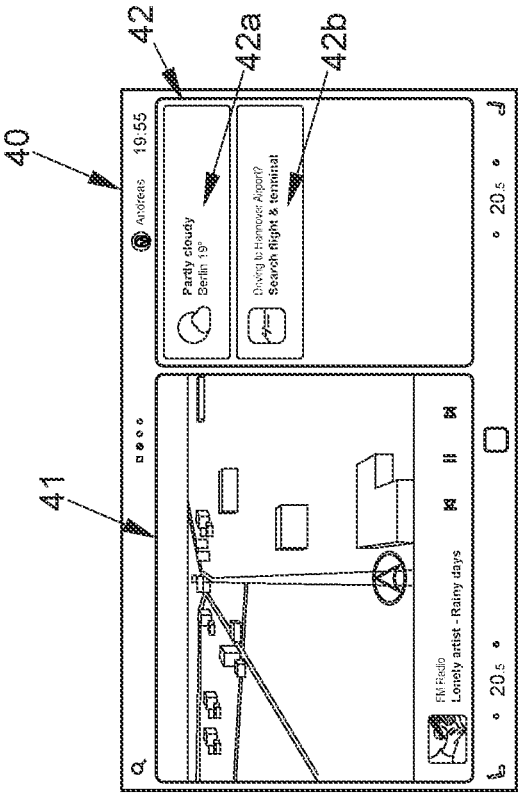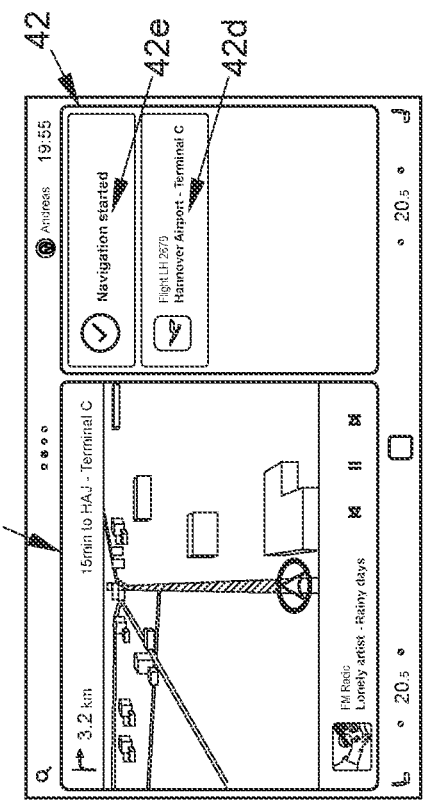
FIG. 4A
FIG. 4B
FIG. 4C
FIG. 4D

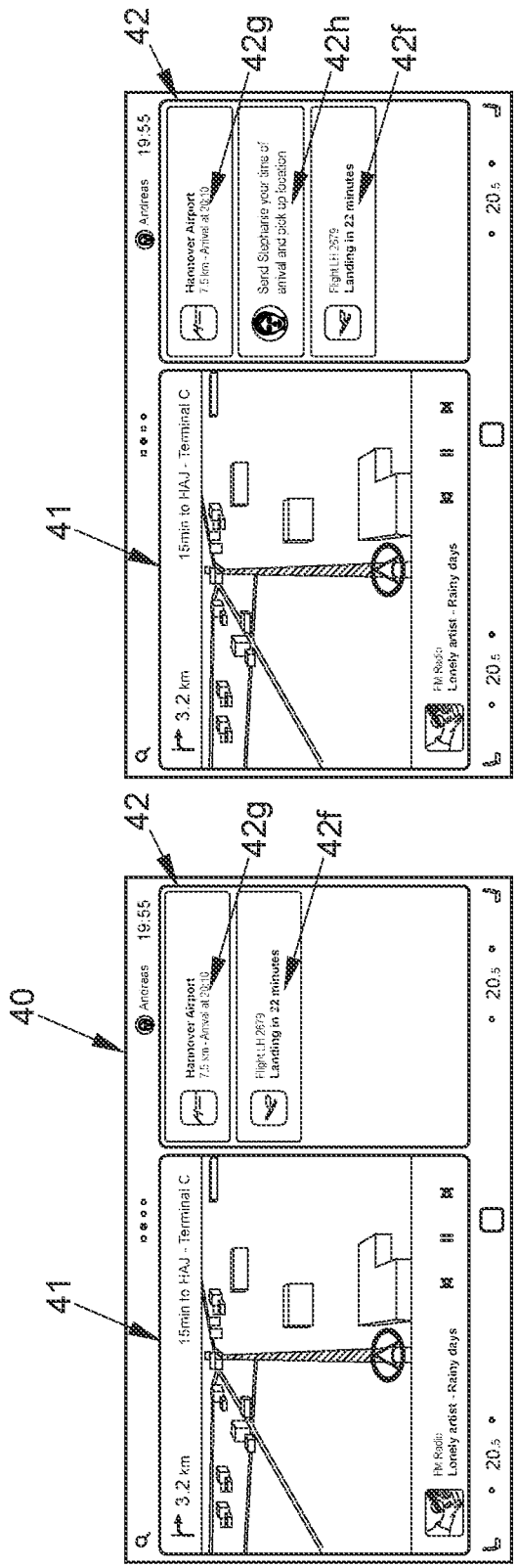
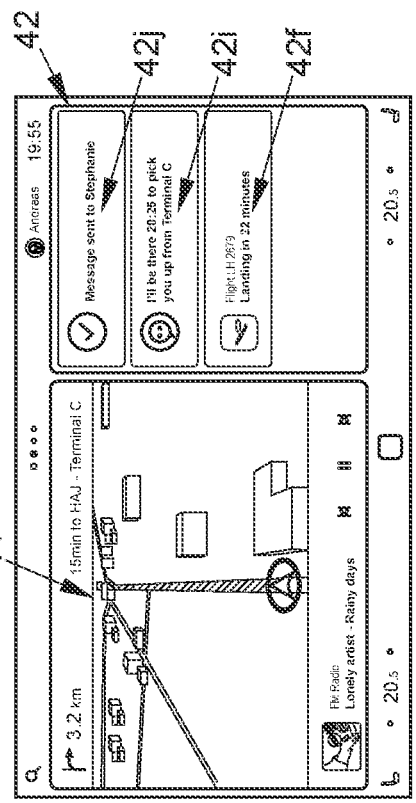
FIG. 4E
FIG. 4F
FIG. 4G

METHOD FOR GENERATING AND OUTPUTTING GRAPHICAL INFO OBJECTS ON A GRAPHICAL USER INTERFACE

CROSS-REFERENCE TO RELATED APPLICATIONS

This application claims priority to German Patent Application No. DE 10 2019 217 733.6, filed on Nov. 18, 2019 with the German Patent and Trademark Office. The contents of the aforesaid Patent Application are incorporated herein for all purposes.

TECHNICAL FIELD

The present invention relates to a method for operating an operating system in a vehicle and to an operating system for a vehicle.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The increasing availability of information from different sources, which is ensured by the Internet, for example, is presenting the user of a modern electronic operating system with new challenges. In the context of automobility, too, there is a discernible trend toward increasing integration of data provided not only by the vehicle itself, but also by external apparatuses. For example, driving assistants, additionally offered services, messaging services, social media, news services and other offerings from third-party providers make available data and notifications that are supposed to be recorded and processed by the user regardless of their diversity and varying relevance. Other possible services which are provided, for example, as online services relate, for example, to the management of parking spaces, the loading and unloading of vehicles, vehicle services and other offerings.

The large amount of incoming information is sometimes modeled as a dynamic stream or feed of data. However, there are no solutions for outputting such a stream that are designed specifically for the needs in a vehicle. Here, it is particularly important that the user, in particular the driver of the vehicle, only has to devote a limited amount of their attention to the operating system, since the driving of the vehicle and the observation of the traffic environment require their full attention.

SUMMARY

A need exists to provide a method and an operating system of the type mentioned at the outset, wherein the user is able to access relevant information in a fast and simple manner.

The need is addressed by a method and an operating system according to the independent claims. Embodiments of the invention are described in the dependent claims, the following description, and the drawings.

BRIEF DESCRIPTION OF THE DRAWINGS

FIGS. 3A to 3F show other exemplary embodiments of displays which can be generated by the operating system; and FIGS. 4A to 4G show other exemplary embodiments of displays which can be generated by the operating system.

DESCRIPTION

Figure 1:
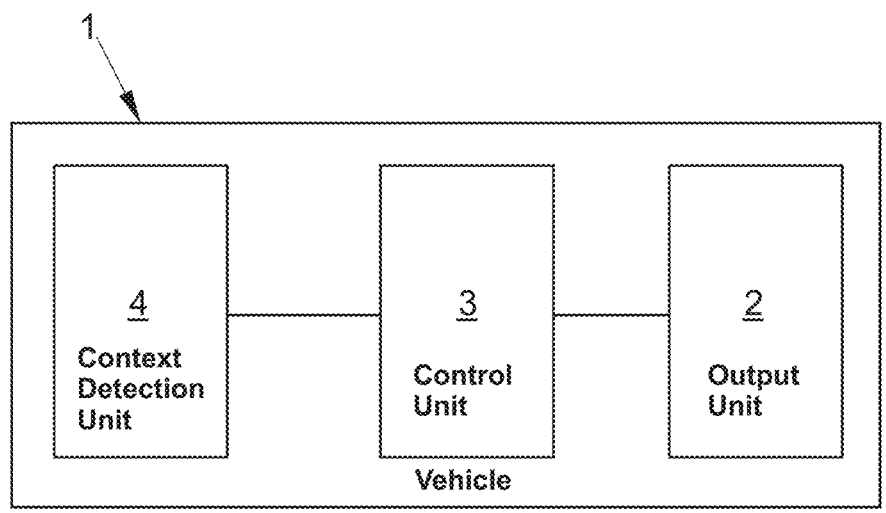
FIG. 1 shows a vehicle with an exemplary embodiment of an operating system.

The details of one or more embodiments are set forth in the accompanying drawings and the description below. Other features will be apparent from the description, drawings, and from the claims.

In the following description of embodiments, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, display data of a graphical user interface comprising at least one first display region are generated and output, wherein the graphical user interface comprises a basic state and an info state. Context data about a current context of the vehicle are recorded and a first relevance value is determined for a first info application based on the recorded context data. The info state is activated depending on the determined first relevance value of the first info application, wherein, when the info state is activated, the first display region is reduced in size such that an info region is formed. A graphical info object is generated using the first info application and output in the info region.

As a result, relevant content can beneficially be output in a particularly simple and clearly comprehensible manner. The user can therefore easily identify when new relevant information is provided and, for example, when an operation is required. At the same time, the space available in the vehicle for displaying graphical data is optimally utilized and flexibly adapted.

The output of the user interface takes place on a display surface that is, in particular, permanently installed in the vehicle, for example on a display surface of a center display in the region of a center console or dashboard of the vehicle. In other embodiments, the output may alternatively or additionally take place in an instrument cluster of the vehicle or by means of an output unit from the field of augmented reality, for example in a head-up display. In another embodiment, the display may further take place on a display surface of a mobile user device, for example a mobile telephone or tablet computer, which is located in the vehicle and is releasably coupled to the vehicle, for example by means of a data connection.

The graphical user interface is designed in a manner known per se. In particular, it comprises a graphical representation for a human-machine interface. In this connection, technical apparatuses can be operated by means of control elements, for which buttons or symbols of the representation may be used, for example. In particular, the user interface may comprise switching and control elements that represent the operation of a functionality in a manner that is comprehensible to a person. For example, the amount of a parameter may be represented and its setting may be visualized by means of a setting element. The user interface may further comprise elements for displaying information and may therefore allow for output that can be interpreted by a person.

In the context of the teachings herein, the basic state of the graphical user interface is defined by the absence of an info region. This does not exclude information also being output in the first display region; however, no graphical object that comprises the specific properties of the info region, in which the graphical info object is represented, is included. In particular, no info objects are dynamically displayed in the basic state, as described further below. Conversely, the graphical user interface comprises an info region in the info state and an info object is output in said info region.

In some embodiments, the recorded context data comprise features of the vehicle, an operating state of the vehicle, features of a journey of a user with the vehicle and/or user data of the user. The context data are beneficially recorded with particular reference to the vehicle and to the journey or, alternatively, operation of the vehicle. As a result, a particularly intelligent response or system reaction to a constantly changing context of the vehicle can be formed.

In contrast to other methods, in which newly incoming messages are to be output on a user interface, according to the teachings herein, the relevance value is determined for the first info application with reference to the vehicle or, alternatively, to the context of the vehicle. As a result, in the method, the output of the info object or, alternatively, the activation of the info state takes place so as to be particularly aligned to the needs of the user in the vehicle, in particular to the driver of the vehicle.

In some embodiments, the context data may relate to a wide variety of areas of use of the vehicle. The features of the vehicle include fixed parameters such as its dimensions, or variable quantities, such as the opening states of doors and windows as well as the occupation of the vehicle by passengers. They may also include a state of charge, a remaining energy reserve, a range, any technical problems, or vehicle-related stops. Furthermore, a driving or parked state may be a feature of this kind. The operating state of the vehicle may, for example, relate to the vehicle driving or being at a standstill, and information about the speed and/or acceleration as well as states of driver assistance systems may also be included. With regard to a journey of the vehicle, the context data may relate to environment data that can be recorded, for example, by means of sensors of the vehicle or that can be retrieved from an external source, for example information about a position of the vehicle and its surroundings, vehicles and objects in the surroundings of the vehicle, traffic-related apparatuses, weather conditions, or points of interest in the surroundings. However, said context data may also include traffic data, congestion data or other information about traffic states as well as traffic warnings. Furthermore, said context data may relate to settings and/or states of a navigation system, for example a destination of a route or a planned route course, and the duration of the planned route may also be taken into account. Other features may be types of journey, for example a commute, weekend excursion or holiday journey, the distinction between single journeys or journeys with a planned return journey. The user data may comprise a variety of personalized data, for example an identity of the driver, front-seat passenger or other passengers. Furthermore, data of an electronic calendar or scheduler, contact data, telecommunication information may be included, for example with text messages or voice calls; furthermore, physiological data, for example relating to a level of tiredness or stress as well as needs of a driver or passenger, may be included, and data about habits or preferences may be recorded based on a usage history or, alternatively, evaluated by means of a learning algorithm.

Context data may further relate to a time of day or time as well as a distinction between weekdays and the weekend.

The context data are recorded in a manner known per se, for example by means of sensors of the vehicle or using a data connection to an external unit by means of which the recording takes place. The context data may further be retrieved from a memory unit that is provided, for example, in the vehicle or in an external apparatus.

In particular, continuous recording and updating of the context data is provided and the method is carried out iteratively based on the currently applicable context data. In other words, the first relevance value for the first info application may be constantly re-evaluated and the representation of the info object may be adapted accordingly. As a result, changing conditions and newly incoming information, for example newly incoming messages or newly occurring events, can be taken into account.

The first info application is, in particular, designed as a computer program. It may relate to various functionalities for which information is output for a user in the vehicle and/or for which possibilities of interaction are to be created. An info application within the context of the teachings herein may, in principle, relate to all applications in which a display can be generated for the user of the vehicle.

In particular, the info application relates to messages or, alternatively, notifications, in particular from external units or external communication partners. It may further relate to additional content that is output in addition to the data output in the first display region. For example, the user may configure the content in the first display region themselves, for example by manually calling up or terminating an application in the vehicle or by activating or deactivating functionalities with which a particular output of information and/or display of operating options on the display surface are associated. In contrast, the info objects output in the info region are automatically generated depending on their relevance to the particular context of the vehicle such that particularly relevant content is output to the user from a consistently dynamic and changing stream of data.

The first relevance value may be determined in a manner known per se. In particular, a particular absolute or relative numerical value is assigned to the first info application at a particular point in time. In particular, the relevance value assesses the relevance of the info application compared with other info applications or the relevance for a particular user is determined in absolute terms. Weighting parameters may be provided, based on which the relevance of particular info applications can be determined depending on the context data, wherein current program states and/or program events, in particular, are taken into account.

For example, info applications may be assigned to categories for which particular parameters of a weighting are determined based on the context data. For example, the relevance values of information applications that relate to the passability of a route are deemed to be particularly relevant, while ongoing navigation of the vehicle is determined based on the context data, in particular if the information about the passability relates to a specifically planned route. Furthermore, info applications that relate to direct telecommunication between the user and another user may be assigned to a category with particularly high relevance, for example in order to display an incoming phone call using a corresponding info application with high priority and to allow the user to accept or answer directly.

In particular, the first display region and the info region are designed as windows or widgets within the graphical user interface. In particular, a widget occupies the entire info region. Furthermore, the graphical info object may be designed as a sub-widget or sub-window that is subordinate with respect to the info region. Therefore, the graphical object may, in particular, be designed as a sub-widget within an info region designed as a widget.

In this context, "windows" should be understood to mean, in particular, delimited regions of the graphical user interface in which data provided by an assigned application program are output. In particular, all graphically output data of an instance of the assigned application are only output in the window. In this context, a "widget" is, in particular, a program integrated in the graphical user interface, i.e. the program is executed if the widget is output in the graphical user interface. Furthermore, other concepts for representing content in particular regions of the graphical user interface may also be used analogously. Sub-widgets are widgets that are subordinate to another widget. They are arranged, in particular, within an area in the graphical user interface that is assigned to the superordinate widget.

In particular, info objects may be designed as "feed cards". Within the context of the teachings herein, this should be understood to mean regions of the display that are designed, for example, in the manner of the per se known display regions, tabs, windows or widgets, in which relevant information is output or operating options are provided at a point in time or during a period of time. A feed card may also be arranged as an info object within other display regions, windows, widgets or objects and is assigned to a particular info application as a source of information or, alternatively, as an operating target for which the relevant data are output.

The info object, for example a feed card, in particular comprises text elements that may also be designed as hyperlinks or so as to be operable in another manner, and/or a graphical symbol based on which a user can identify the assigned info application, for example. Furthermore, fixed sizes and design templates may be provided for the info object, for example a single- or multi-row design, smaller and larger dimensions for which particular levels are defined, defined regions for text and/or image elements as well as specifications for the color and/or typographic design.

In some embodiments, the arrangement and/or the size of the graphical info object may be designed depending on the first relevance value. The info object may, for example, be represented larger the higher the assigned relevance value. Furthermore, the larger the relevance value, the nearer the info object may be arranged to a particular position within the info region, for example nearer to an edge of the info region. Conversely, the smaller the relevance value, the nearer the info object may be arranged to another position, for example nearer to an opposite edge of the info region. Furthermore, a ranking of multiple info objects may be determined based on the relevance values for various info applications, wherein, in this case, the info objects are displayed in the info region one below the other or one next to the other in a particular order. Other properties of the representation of the info objects may also be designed based on the relevance value, for example graphical parameters such as color, saturation, transparency or contrast. For example, info objects assigned a low relevance value, in particular if the relevance value is below a relevance threshold value, may be represented in a particular manner, for example grayed out or in another way so as to be much less discernible than info objects with a higher relevance value.

In some embodiments, the graphical info object may itself also be designed as a widget, namely a program that can generate an information output or provide operable elements. Furthermore, the graphical info object may be designed as a sub-widget that is subordinate to another widget and, in particular, be assigned to an individual instance of an info application. By means of the widget, inputs can also be recorded and corresponding control signals can be generated for other apparatuses and/or programs.

In some embodiments, the first relevance value is compared with a relevance threshold value and the graphical info object is generated if the first relevance value exceeds the relevance threshold value. In particular, the info region is only generated if an info application has a relevance value that exceeds the relevance threshold value. This ensures that info objects are only output if their relevance exceeds a particular minimum value.

The relevance value may, in particular, be time-dependent, i.e., it changes depending on the time. The first info application may therefore have a different relevance at one point in time to another point in time. Furthermore, a period of time assigned to the output of the first info object may also be determined. In other words, the info object is output for the particular period of time and may then be faded out, for example if another info object is to be output. Furthermore, the info object may be faded out after the period of time has elapsed or its output may be terminated in another manner and the info objects or the first info region may disappear again from the display, in particular in that the first display region is increased in size again and subsequently extends over the area of the first info region, for example.

In particular, the graphical info object relates to an incoming message of a telecommunication system, i.e., in particular, a text message received from a telecommunication partner, and comprises at least one automatic response option. The automatic response option can be selected by means of an operational action. After the selection, a response is generated and sent for the telecommunication partner, in particular based on the automatic response option. The automatic response option is, in particular, formed depending on the recorded context data, for example by means of methods of artificial intelligence or machine learning. As a result, the user is able to react to the message quickly and in a manner adapted to the context.

For example, the system receives a text message with a request of the telecommunication partner. The response option, if applicable a selection of multiple response options, is automatically generated and displayed to the user. This takes place, in particular, based on the recorded context data. A response option is selected and a corresponding response is automatically sent to the telecommunication partner by means of the operational action.

In particular, the graphical info object relates to a scheduling conflict and comprises at least one automatic notification option. The automatic notification option can be selected by means of an operational action. After the selection, a notification is generated and sent for a telecommunication partner, in particular based on the automatic notification option. The automatic notification option is, in particular, formed depending on the recorded context data, for example by means of methods of artificial intelligence or machine learning. As a result, a relevant notification can beneficially be generated particularly quickly when a scheduling conflict arises on account of a changed context of the vehicle, for example in the event of traffic obstructions.

For example, it is detected that a delay in the journey means that an appointment determined based on schedule data cannot be made. A contact person is determined and a notification is generated based on the schedule data, which are in this case comprised by the context data. These notification options, if applicable a selection of multiple notification options, is displayed to the user. A notification options selected using an operational action serves to generate a notification and said notification is sent to the contact person.

During the transition from the basic state to the info state, in the method, the first display region is reduced in size and thus an info region in which the graphical info object is subsequently output for the first info application becomes free. This transition may be displayed in a variety of manners known per se.

In some embodiments, when the first display region is reduced in size, a sequence of images is generated such that a shift of at least one edge of the first display region is represented. In particular, a shift of the entire first display region may additionally or alternatively be represented. The output thus beneficially takes place such that the transition from the basic state to the info access can be identified by the user in a particularly quick and intuitive manner by means of an animated representation.

For example, a lateral edge of the first display region is shifted such that said first display region is reduced in size. The info region is formed in the free region formed in the process, which info region is then arranged so as to be laterally next to the first display region. This process takes place, in particular, by means of an animated reduction in size of the display region. In other words, in the method, the first display region is, in particular, not covered by content of the graphical info object, which would be the case, for example, for the known representation of a pop-up. Instead, the display is changed within the graphical user interface such that a free info region is created and the graphical info object is arranged there.

In some embodiments, the graphical user interface further comprises a second display region, which is arranged so as to adjoin the first display region in the basic state of the graphical user interface. The info region is formed between the first and the second display region when the info state is activated. The info region can thus be shifted between multiple display regions.

The display regions may be delimited by a displayed border, but they may also comprise a virtual boundary. Adjacent display regions may be displayed with an intermediate space between their edges, wherein adjacency is still assumed, provided that no other objects are or, alternatively, can be arranged between the display regions.

In some embodiments, the sizes of the two display regions between which the info region is formed may change, in particular by spreading the first and second display region apart, wherein the second display region may also be reduced in size, if applicable. Furthermore, the edges of the display regions adjoining one another in the basic state may be shifted away from one another. Conversely, the reduction in size may only be carried out for one display region, while the other display region is represented unchanged. Furthermore, the arrangement of the display regions may be adapted by means of shifting.

In some embodiments, when the info state is activated, the graphical info object is shifted with a movement from an edge of the info region into the info region. In particular, an animation is output, i.e. a sequence of images that creates the impression of a continuously moving info object. As a result, the fact of the graphical info object being shifted from outside into the user interface can beneficially be represented. In particular, the graphical info object appears by dropping or shifting into the info region.

Furthermore, the info object may be faded in with continuously increasing intensity, brightness, contrast or size or appear within the graphical user interface in another manner. By shifting the graphical info object, a resorting of multiple info objects can also be represented, which info objects may, for example, be represented as sub-widgets within a superordinate widget or window. Conversely, info objects may disappear in a similar manner, for example if their relevance value falls below a particular threshold value, for example by moving the info object out of the info region or by fading it out.

In some embodiments, other methods of graphical representation known per se may be used in order to make the info object appear in the info region. The info object may, for example, be faded in with changing brightness or another representation parameter; it may be formed within the representation by increasing or decreasing in size as well as by means of other effects for appearing.

In the method, it may further be provided that the info object disappears or is faded out from the user interface. This may, for example, take place if another info object is to be displayed for an info application with a higher relevance or if the relevance value of the first info application no longer exceeds a particular threshold value. In this connection, a disappearance may, for example, be represented such that the info object is shifted out of the info region. In particular, the representation of the movement points in the same direction as when the info object emerges. For example, the info object with a higher relevance value initially "drops" into the info region from above and later "drops" out downward in order to free up the info region again when the relevance value is lower or another info object is to be displayed. Similarly, the info object, if it was initially "shifted" into the info region from the side, may later be "shifted out" on the opposite side.

In the method, it is in particular provided that at most one info object is only ever fully represented in the info region. In particular, in the event of a switch between various info objects, i.e., if, for example, the graphical info object is replaced with a second info object, the two info objects are represented in part. In other embodiments, multiple info objects may be displayed in the info region at the same time, wherein the arrangement and/or design of the info objects relative to one another are determined, in particular, based on the currently applicable relevance values.

In some embodiments, a second relevance value of a second info application is also determined and a second graphical info object is generated using the second info application. The second graphical info object is output in the info region, wherein a sequence and/or a display duration for the first and second info object is determined depending on a comparison of the first and second relevance value. As a result, multiple info objects can beneficially be output, in particular in a particular sequence one after the other and/or for a particular period of time in each case.

In particular, the info object that is assigned to the info application with the higher relevance value is displayed first according to the sequence or, alternatively, for a longer time according to the display duration. The relevance values are determined based on the context data, wherein currently applicable context data are taken into account, in particular. In other words, the relevance values may change if the context data are updated and a modified sequence or, alternatively, a modified display duration may be produced for the info objects.

Furthermore, a dynamic resorting of the displayed info objects may be output, in particular by means of an animation, wherein a movement of an info object to another position within the displayed row of info objects is output.

In some embodiments, the first and second graphical info object are displayed one after the other, wherein the first graphical object is initially displayed and, subsequently, the second info object is displayed instead of the first info object, wherein the first or second info object can be displayed by means of an operational action. As a result, a history of the represented info objects can be called up.

For example, the info objects are displayed in that they are shifted into the info region from an edge of the info region. If another info object is displayed, the one already displayed can be displaced by the new info object. For example, info objects are shifted into the info region from above or, alternatively, "drop" into the info region. Other info objects to be displayed in the info region also come from above, while info objects already displayed before are shifted downward or, alternatively, "drop out of the info region". Similarly, a lateral shift may be represented or a new info object may be shifted upward from a lower edge into the position in which it is ultimately to be displayed.

Furthermore, multiple info objects may be displayed at the same time, wherein a quantity of info objects that can be represented is defined, wherein a subset of the quantity of info objects is displayed at the same time, and said subset may also comprise exactly one info object.

The operational action for displaying the first or second info object comprises, in particular, a swiping gesture, by means of which a row of represented info objects is shifted, such that the currently output subset of the info objects is changed. For example, the info objects dropping into the info region is represented, wherein a new info object displaces a previously represented info object downward. The representation takes place such that the info objects represented currently and earlier are arranged along a virtual band that can be shifted in a perpendicular direction by means of a swiping gesture.

The design of previously represented info objects may be changed if they are displayed again by means of the operational action. In particular, the assigned relevance value may change and an info object may be marked as obsolete if said relevance value drops below a relevance threshold value. This may take place in various ways known per se, for example by means of a grayed-out representation with a lower color saturation, brightness or reduced contrast. Furthermore, it may be provided that, in the case of obsolete info objects, they may no longer be operable as before or may only be operable to a limited extent.

In some embodiments, the first graphical info object comprises a control element, an actuation of the control element is detected, and an additional info region in which an additional graphical info object is output is formed. As a result, additional regions can beneficially be utilized in order to output additional information and/or in order to allow for continued operability for the currently displayed info object or, alternatively, for the info application assigned thereto.

The additional info object is output, in particular, outside the info region. Said additional info object may, for example, cover other regions, for example in the manner of a pop-up, an additional window or, alternatively, widget, or as an extension of a window or, alternatively, widget represented in the info region.

In the method, the additional info object may further be represented such that it occupies another display region of the graphical user interface, in particular the above-described first or second display region, and replaces previously represented content, if applicable. For example, the info object is represented in the info region and—if applicable after an operational action such as a tap or other actuation in the region of the info object—a display region arranged, in particular, adjacently thereto is replaced with a display of the additional info object that is associated with the info application.

If such a replacement of the content of another display region is provided, it may further be provided that a priority value is assigned to each of the display regions of the graphical user interface. Depending on this priority value and, in particular, the relevance value for the respective info object, it can be determined whether a content of a display region is permitted to be replaced with the additional info object or, alternatively, in which display region of the graphical user interface such a replacement is carried out. In other words, if an additional info object is additionally to be represented, for example after actuation in the region of the info object, it can be determined based on the priority value of an adjacent display region whether the content of said display region is permitted to be replaced with the additional info object; in the process, the relevance value for the info application is in particular also taken into account for the additional info object.

The additional info object may be represented together with the info object in the info region and be removed from the display together therewith after a particular period of time or after detection of an operational action. Furthermore, similarly to that described above for the info objects, said additional info object may be saved in a history and called up again by means of an operational action.

In the method, subsequently to the output of the info object, the info region may also be removed from the graphical user interface again, wherein the first display region is increased in size again. In particular, a gap that was created previously by means of the reduction in size of the first display region is closed again as result. For example, the info object disappears after a particular display duration or after a particular operational action of the user, or the relevance value of the assigned info application decreases such that it falls below a relevance threshold value, for example, and the associated info object is no longer to be represented.

An operating system for a vehicle comprises a control unit, which is configured to generate display data of a graphical user interface comprising at least one first display region, an output unit, which is configured to output the display data, wherein the graphical user interface has a basic state and an info state, and a context detection unit, which is configured to record context data about a current context of the vehicle. The control unit is further configured to determine a first relevance value for a first info application based on the recorded context data, to activate an info state depending on the determined first relevance value of the first info application, wherein, when the info state is activated, the first display region is reduced in size such that an info region is formed, and to generate a graphical info object using the first info application and to output said graphical info object in the info region.

The operating system is in particular designed to be operated by means of the above-described method. The operating system therefore has the same benefits as the method.

The invention will now be discussed in further detail based on exemplary embodiments with reference to the drawings. Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

A vehicle comprising an exemplary embodiment of the operating system is explained with reference to FIG. 1.

The vehicle 1 comprises an output unit 2, which is designed as a display 2 in the exemplary embodiment. The display 2 is coupled to a control unit 3 of the vehicle 1. The vehicle 1 further comprises a context detection unit 4, which comprises various sensors and detection apparatuses in the exemplary embodiment.

In the exemplary embodiment, the context detection unit 4 is designed to record environment data in the surroundings of the vehicle, wherein a camera and radar sensors are used. Objects, vehicles and other road users can be detected in the surroundings of the vehicle 1 based on the data from these sensors. Furthermore, a GPS sensor is provided, by means of which the position of the vehicle 1 can be determined. Furthermore, the context detection unit 4 comprises an interface to a CAN bus of the vehicle 1, via which, for example, a speed and acceleration of the vehicle 1 as well as other vehicle data can be recorded. The context detection unit 4 can access user data of a user by means of another interface to a new mobile user device (not shown), which user data comprise a contact database, a telecommunication system for text and voice messages as well as schedule data in the exemplary embodiment. In other exemplary embodiments, other sensors may alternatively or additionally be used, for example lidar, ultrasound or apparatuses for observing the vehicle interior, or interfaces to other apparatuses may be provided, for example social networks, cloud services or other external services.

The display 2 is designed in a manner known per se and, in the exemplary embodiment, is integrated as a center display in an instrument cluster of the vehicle 1. The display may be integrated in a touchscreen, wherein a touch-sensitive surface is arranged over a display surface of the display 2 and inputs of a user can be detected.

Exemplary embodiments of displays which can be generated by means of the operating system are explained with reference to FIGS. 2A to 2C, proceeding from the above-explained exemplary embodiment of the operating system.

Figure 2A:
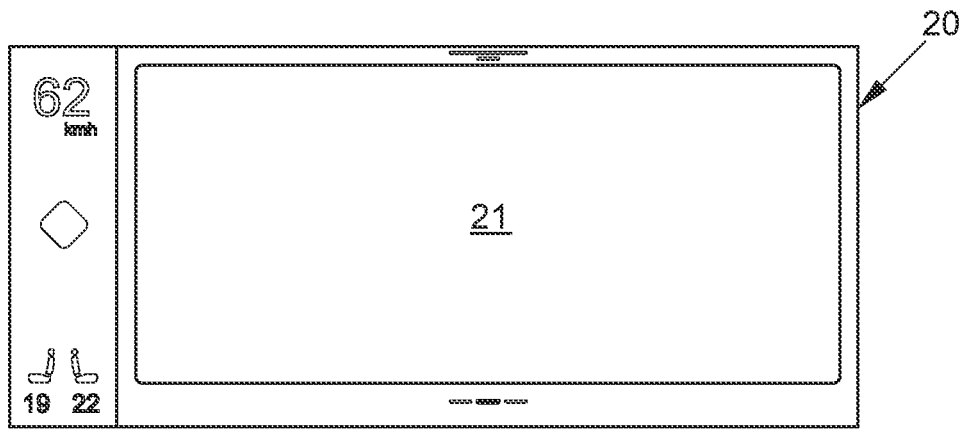
FIGS. 2A to 2C show exemplary embodiments of displays which can be generated by the operating system.

In the case shown in FIG. 2A, a graphical user interface 20 comprises a display region 21. Said display region is a surface region formed within the user interface 20 and reserved for outputting thematically related information. In the exemplary embodiment, the display region 21 is designed as a widget 21, i.e. it comprises the output of data as well as the provision of operating options for an application program integrated in the graphical user interface 20. The widget 21 may, for example, relate to navigation, media playback, telecommunication and/or an application program for another task.

Furthermore, other display elements are provided within the graphical user interface 20, for example an output of the current speed of the vehicle 1 as well as an output relating to the settings of a seat heater, however this is not discussed further in the following. In spite of these additional elements within the user interface 20, the representation in FIG. 2A of a large display region will be referred to as a "full-screen representation" for the display region 21.

Figure 2B:
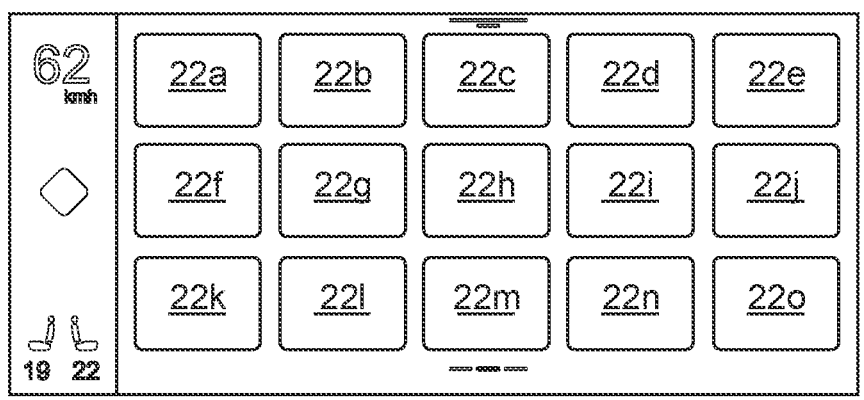

In the case shown in FIG. 2B, the graphical user interface 20 comprises multiple display regions 22a to 22o, which are arranged in a matrix. Here, too, the display regions 22a to 22o are designed as widgets 22a to 22o. They may also be designed as program symbols, the actuation of which causes a switch to a full-screen representation as in FIG. 2A, wherein a respectively assigned application program is called up.

Figure 2C:
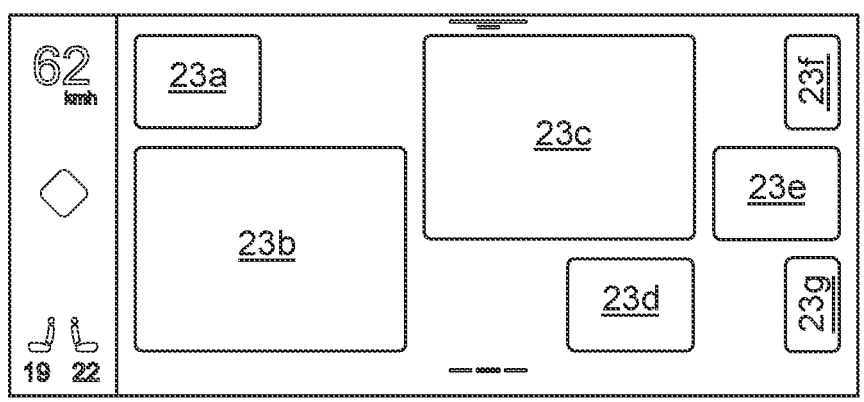

In the case shown in FIG. 2C, display regions 23a to 23g are distributed less uniformly within the area occupied by the full-screen representation of the display region 21 in the case shown in FIG. 2A. Here, too, the display regions 23a to 23g are designed as widgets 23a to 23g in the exemplary embodiment. It may be provided that, by actuating a widget 23a to 23g, a full-screen representation is produced for a respectively assigned application program as in FIG. 2A.

In the exemplary embodiment, it is provided that switching can take place between the representations shown in FIGS. 2A to 2C, in particular by means of an operational action which comprises, for example, a swiping gesture, a rotation or a shifting of a control element or another actuation. Furthermore, a control element may be provided within the user interface 20, the actuation of which control element makes it possible to switch between the various cases of FIGS. 2A to 2C.

An exemplary embodiment of the method is explained based on the exemplary embodiments shown in FIG. 3A to 3F of displays which can be generated by means of the operating system, proceeding from the above-explained exemplary embodiment of the operating system.

Figure 3A:
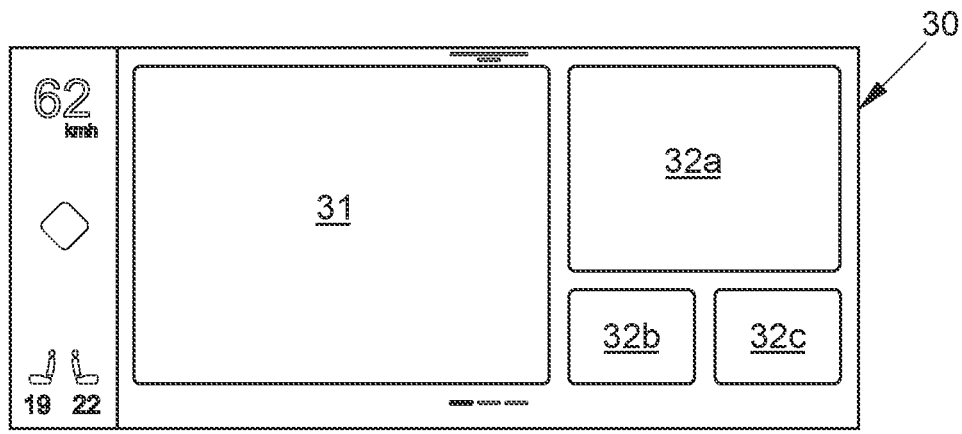

In the case shown in FIG. 3A, a graphical user interface 30 comprises a first display region 31 as well as three other display regions 32a to 32c. The other display regions 32a to 32c are arranged in the right-hand region of the user interface 30 and are designed to be smaller in their extent than the first display region 31 in the left-hand part of the user interface 30.

In the exemplary embodiment, a user can, in a manner known per se, configure the content and/or operating options output in the first display region 31 as well as in the other display regions 32a to 32c. For example, an output of the navigation system is output in the first display region 31.

In the exemplary embodiment of the method, said state is defined as the basic state of the graphical user interface 30. Context data are continuously recorded for the vehicle 1 by means of the context detection unit 4 and evaluated by means of the control unit 3. At the same time, a plurality of info applications are run, by means of which a variety of data can be output and by means of which operating options can be provided. The info applications are run, in particular, in the vehicle 1, for example by means of a computing unit coupled to the control unit 3 or another apparatus. In particular, info applications are run by means of a mobile user device that is coupled to the vehicle 1. Furthermore, info applications may be provided by vehicle-external apparatuses, for example by an external server, in particular in the case of online services or, alternatively, cloud services. The available info applications may, for example, be formed depending on the identity of a user or depending on the vehicle 1, for example if the info applications are coupled to a particular user of the system that runs the info applications. Relevance values that specify how relevant an instance of an info application is in the current context of the vehicle 1 are determined for the various info applications based on the recorded context data. For this purpose, in the exemplary embodiment, a series of predefined weightings are used for various info applications, wherein the weightings may also be formed depending on the current context.

For example, a high relevance value is determined for an info application by means of which an incoming phone call is output via a telecommunication system and by means of which the user can answer the phone call. An info application for outputting information about points of interest in the spatial surroundings of a route currently being traveled on can be deemed to have a high relevance value if the vehicle 1 is currently located at a position in the vicinity of such a point of interest. Furthermore, info applications for outputting information about an activity of a driver assistance system or, alternatively, for detecting inputs of the user for a driver assistance system can have a high relevance if an activity of the driver assistance system for guiding the vehicle 1 in the current context is deemed to be necessary or sensible.

In contrast, low relevance values can, for example, be determined if an info application relates to information about points of interest that are far away from the current position of the vehicle 1.

In the exemplary embodiment, a relevance threshold value with which the relevance values for individual info applications are compared is defined. If the relevance threshold value is exceeded, it is assumed that an info object is to be generated for the info application in order, for example, to display relevant information to the user and/or to make a relevant operation possible for said user. However, if the relevance threshold value is not reached, it is assumed that the info application is not sufficiently relevant in the present context.

In other exemplary embodiments, the relevance threshold value may be dynamically formed depending on the context. For example, a higher relevance threshold value is determined if in the current context heavy demands are placed on the user, in particular the driver of the vehicle 1, for example due to a complicated traffic situation, and no displays with a lower relevance can be processed. In other words, if a challenging or difficult traffic situation in which the driver should not be disturbed is identified based on the current context data, the relevance threshold value is determined so as to be accordingly high. Conversely, a lower relevance threshold value can be determined if the vehicle is driving straight, if the relevant user is not the driver of the vehicle or if the vehicle is being guided by means of at least partially automatic driver assistance systems.

Figure 3B:
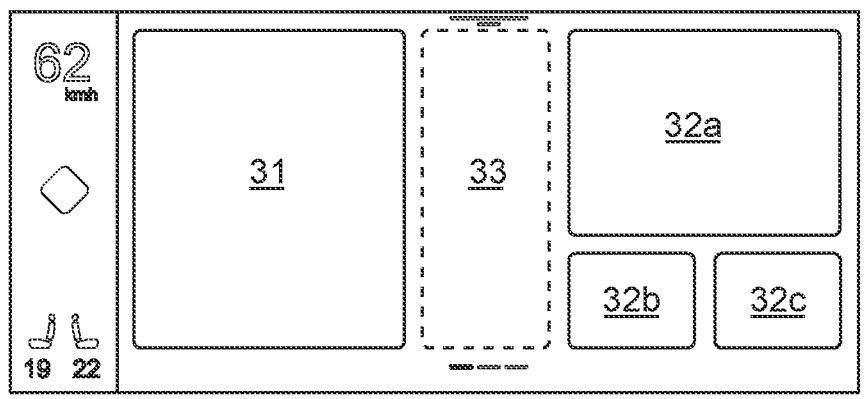

In the case shown in FIG. 3B, it has been identified that the relevance value for a particular info application exceeds the relevance threshold value in the current context. Therefore, a graphical info object 34 assigned to the info application and designed as a widget 34 for this info application is to be output. For this purpose, a reduction in size of the first display surface 31 is represented in that the right-hand edge thereof is shifted left. As a result, a free area in which an info region 33 is formed is produced. In the exemplary embodiment, only the size of the first display region 31 changes, but in other exemplary embodiments the other display regions 32a to 32c may additionally or alternatively be changed in size such that the info region 33 is produced. Furthermore, for example in addition to a reduction in size, a shift of the first 31 or the other display regions 32a to 32c may also be represented in order to produce the info region 33.

In the case shown in FIG. 3C, the info object 34 is represented in the info region 33 in the same way as it is shown in FIG. 3B. For example, the info object 34 is displayed as a so-called feed card. The info object 34 is designed as a widget 34.

In the exemplary embodiment, it is provided that, during the transition from the situations shown in FIG. 3B to the appearance of the info object 34 in FIG. 3C, an animated representation is generated such that a "drop" of the first info object 34 into the info region 33 is represented. In other words, the info object 34 moves proceeding from the upper edge of the info region 33 in a downward movement within the graphical user interface 33 before coming to a halt approximately in the center of the info region 33. In other exemplary embodiments, the info object 34 may appear in another manner, for example in that it is "shifted" into the info region 33 from a lateral direction, by means of fading in or in another manner known per se.

In the exemplary embodiment, it is further provided that the info object 34 is represented such that an impression of a perspective representation is created, such that the info object appears to be tilted backward relative to the plane of a display surface in which the graphical user interface 30 is displayed, which results in a trapezoidal outline of the info object 34 in a projection onto the plane of the display surface. In contrast, the other display regions 31, 32a to 32c have substantially rectangular outlines. In other exemplary embodiments, it may be provided that the info object 34 is also designed comprising a rectangular or other outline. Furthermore, highlighting formed in a manner known per se may be provided, by means of which the info object 34 is highlighted with respect to the other display regions 31, 32a to 32c.

In the case shown in FIG. 3D, the graphical user interface 30 further comprises an additional info object 35, in this case a widget 35 again, which replaces the other display regions 32a to 32c in the right-hand region of the graphical user interface 30. In the represented exemplary embodiment, this state was achieved by means of an actuation of the info object 34, wherein a more comprehensive representation of the assigned info application was called up by means of said actuation. In the exemplary embodiment, the info object 34 and the additional info object 35 are represented in a perspective manner such that they represent two feed cards that have been pivoted relative to the plane of the graphical user interface 30, wherein the additional info object 35 represents a visual continuation of the info object 34, which also demonstrates a content link.

The cases shown in FIGS. 3E and 3F substantially correspond to the cases explained above with reference to FIGS. 3C and 3D. However, the additional info object 35 is formed in a region to the left of the info object 34 and replaces the first display region 31. The perspectively represented pivoting of the info object 34 relative to the plane of the graphical user interface 30 is accordingly reversed.

In the exemplary embodiment, it is decided whether the representations are output in a similar manner to in FIGS. 3C and 3D, i.e. with an additional info object 35 in the right-hand region, or in a similar manner to in FIGS. 3E and 3F, i.e. with an additional info object 35 in the region to the left of the info object 34, in that priorities of the content output in the first display region 31 and in the other display regions 32a to 32c are determined, in particular depending on current context data. In other words, it is ascertained which content is currently of higher importance and which content can be concealed or displaced by the additional info object 35 at least temporarily. In other exemplary embodiments, a threshold value may also be set, wherein content is not permitted to be covered or replaced by an additional info object 31 if said threshold value is exceeded, and therefore said additional info object cannot be represented, in particular if all display region 31, 32a to 32c exceed the threshold value.

In other exemplary embodiments, the user may further use an operational action to determine on which side of the info object the additional info object 35 is to be output, for example using a swiping gesture in the corresponding direction.

In another exemplary embodiment, the info object 35 may be output as a pop-up, wherein the representation of the graphical user interface 30 shown in FIG. 3A, in particular, is at least partially covered. In other exemplary embodiments, the additional info object 35 may be output as a pop-up, wherein the representation of the graphical user interface 30 shown in FIG. 3C or 3E, in particular, is at least partially covered.

Another exemplary embodiment of a method is explained based on the exemplary embodiments shown in FIGS. 4A to 4G of displays which can be generated by means of the operating system, proceeding from the above-explained exemplary embodiment of the operating system. Furthermore, elements that are designed in a similar manner to the displays explained above with reference to FIGS. 3A to 3F are not described in detail again.

In the case shown in FIG. 4A, the graphical user interface 40 comprises a first display region 41, in which data of a navigation system as well as data of a media playback are output, and an info region 42, which is designed here as a widget 42.

In other exemplary embodiments, it may be provided that, in a similar manner to in the displays explained above with reference to FIGS. 3A to 3F, the info region 42 is only generated if a relevance value that exceeds a particular reference threshold value was determined for an info application; in the process, the first display region 41 may initially extend over substantially the entire width of the graphical user interface 40 and subsequently be reduced in size in order to form the info region 42.

Info objects 42a to 42j that are designed as sub-widgets 42a to 42j are output in the info region 42. In other words, they are subordinate to the widget 42, which represents the info region 42, and are output within the area occupied thereby. In the exemplary embodiment, the info objects 42a to 42j each comprise a graphical representation that is formed, in particular, depending on the respectively assigned info application, such that the user can immediately identify the type of information or operating option. Said info objects further comprise text elements, and they may also be represented with a border and, if applicable, shading. Furthermore, using graphical methods of representation that are known per se, it is possible for an info object 42a to 42j to be highlighted with respect to other info objects 42a to 42j or to be represented in the foreground.

In the exemplary embodiment, in a similar manner to that already described above, relevance values are determined for a plurality of info applications and compared with a relevance threshold value. If the relevance threshold value is exceeded, a corresponding info object 42a to 42j is output in the info region 42. The info objects 42a to 42j are represented one below the other, wherein their arrangement in a sequence and their size is established according to their relevance value. The higher the relevance value, the further up an info object 42a to 42j is output. Furthermore, info objects 42a to 42j identified as particularly relevant are increased in size and represented further forward.

The displays shown in FIGS. 4A to 4G constitute an example display procedure while the context of the vehicle 1 changes with time, inter alia because the vehicle 1 is moving, because communication is being carried out, because the user is performing operational actions and because external data and notifications are being received.

In the case shown in FIG. 4A, the recorded context data comprise, for example, a current position of the vehicle 1 of a particular position, a route traveled on toward an airport, and weather information provided by an external unit. Here, the info region 42 comprises a first info object 42a, by means of which information about the current weather in the current surroundings of the vehicle 1 is output, and a second info object 42b, which is assigned to an info application by means of which an airport was identified as a probable travel destination and an operating option is offered to the user in order to retrieve information about incoming flights at the airport.

In the case shown in FIG. 4B, the info region 42 comprises another info object 42c, which replaces the output of the weather data, since a higher relevance was determined for it. The other info object 42c outputs the content of a text message, wherein the sender is represented with a name and profile image. Another info application evaluates the content of the text message, which comprises the specification of a flight number, an indication of an imminent landing and an indication of a planned pick-up at the airport.

In the case shown in FIG. 4C, the info region 42 comprises an info object 42d with information about the flight mentioned in the text message, namely the destination airport and the terminal at which the flight arrives and at which pick-up can take place. In contrast to the case shown in FIG. 4B, the info object 42b, by means of which the retrieval of flight data was offered, is replaced.

In the case shown in FIG. 4D, it is assumed that the user has started navigation to the airport, for example by actuating the info object 42d with details about the airport terminal. The route guidance is output in the first display region 41. Here, the info region 42 comprises another info object 42e, which replaces the info object 42c with the output of the text message, wherein it is confirmed to the user that navigation has been started.

In the case shown in FIG. 4E, the navigation is continued and info objects 42f, 42g, which inform the user of the progress of the navigation and of the expected arrival time of the flight, respectively, are output in the info region 42.

In the case shown in FIG. 4F, an automatic response option is offered, by means of which the user can react to the previously output text message. For this purpose, an info object 42h is output, which comprises an indication that an arrival time at the airport and a location for pick-up can be reported to the communication partner. In the exemplary embodiment, this info object 42h is arranged between the info object 42g, which relates to the navigation, and the info object 42f, which relates to the likely arrival time of the airplane.

In the case shown in FIG. 4G, it is assumed that the user has consented to a corresponding message being sent, for example by actuating the info object 42h for the automatic response option. An info object 42j is output, which confirms sending of the automatically generated response, and an info object 42i is output, which reproduces the text of the automatic response.

At transitions between different arrangements and configurations of the graphical info objects 42a to 42j, different representations can be output, in particular with an animated representation, in which the output appears by means of a sequence of images. Individual info objects 42a to 42j may appear or disappear, wherein fading-in and fading-out is represented. Furthermore, an info object 42a to 42j may be highlighted, for example by means of graphical representation options that are known per se or by means of a spatial change, wherein, for example, an info object 42a to 42j is pushed into the foreground, which can be represented, for example, by changing the size and/or by means of shading. Info objects 42a to 42j may also be rearranged, wherein their shifting relative to one another and relative to the info region 42 may be represented. Furthermore, the content of an info object 42a to 42j may be updated, wherein the content within the info object 42a to 42j is changed and, in particular, replaced with new content.

Furthermore, interactions of a user with individual info objects 42a to 42j or with elements comprised thereby may also be carried out. For this purpose, a detection unit is provided, for example a touch-sensitive surface of a touchscreen by means of which the output of the graphical user interface 40 also takes place, or other types of detection. The interactions may include, for example, tapping or clicking on a graphical info object 42a to 42j, wherein a distinction can be made between a single or multiple tap as well as between taps of various types, for example a left and right click, one finger or multiple fingers. Furthermore, longer-lasting contact, a so-called long press, may be detected and other operating options may be provided, for example in the manner of a context menu or additional options. Furthermore, a swiping gesture or another operation may be provided in order to discard a graphical info object 42a to 42j, for example by means of shifting out of the info region 42, for example if the user deems a particular info object 42a to 42j to be irrelevant.

In other exemplary embodiments, it is further provided that info objects 42a to 42j that are no longer relevant or are less relevant than other info objects 42a to 42j are represented further down than more relevant info objects 42a to 42j within the info region 42. Over time, this results in info objects 42a to 42j sliding so far down that they are shifted beyond the lower edge of the info region 42 and are no longer visible. In other words, a plurality of info objects 42a to 42j can be represented, but, in reality, only a subset is actually represented. The arrangement of the plurality of info objects 42a to 42j corresponds to a history of the info objects 42a to 42j, since info objects 42a to 42j represented earlier are still included hereby. In particular, the representation of such info objects 42a to 42j that are no longer relevant is changed, for example by means of a grayed-out representation. Less relevant or, alternatively, older info objects 42a to 42j can still be called up by means of an operational action, for example a swiping gesture in the region of the info region 42, as a result of which the row of info objects 42a to 42j represented one below the other is shifted and a new subset is represented. Operational actions of this kind may also be used to learn preferences of a user, for example by means of a machine learning method. The learned data can, in turn, be recorded as context data and taken into account.

The graphical user interface 30, 40 represented in the exemplary embodiments allows for an output of information and/or operating options on the basis of context data. Said context data may, for example, relate to information about a learned behavior of a user, for example behavioral patterns in particular classified situations, during shopping, on the way to work or when refueling, picking up children or the like. Furthermore, a variety of information may be taken into account, for example about a driving style, a communication style, for example by means of telephone calls or video or text messages, media consumption, leisure activities, a networked home environment (smart home) as well as about a current position and a stay in a defined environment, the type of current journey, weather conditions, contact lists, if applicable fellow passengers, a current traffic situation and a stress level of the driver, the travel time and distance, a load or the like. Based on this variety of information about the current context, it can be determined when the user should be informed of particular information and offered operating options. This primarily takes place when the user can cognitively absorb and process said information, i.e. when the driving situation and the context allow for location-related services to be displayed, for example.

Furthermore, a prioritization of the representable information may take place based on the relevance value in order to represent that which is relevant in a particularly clear manner, while other content is reduced in comparison until irrelevant information units and displays are completely faded out.

As a result, it can be determined when the user should be offered particular information and operating options, for example relating to services and offerings. As a result, advertising content, for example, can be output such that it corresponds to the actual interest of the user in a particular context and can be easily understood by said user.

Unlike in known methods, the focus of the teachings herein is on the management of the info objects depending on their relevance. Content and additional objects can be represented within the graphical user interface in order to display messages, information and services. In particular, a special display tile within the graphical user interface designed as an info region serves as a display container for representing the content.

The info objects have a particularly flexible operating depth, which can be designed arbitrarily by adapting the size, arrangement and content, from a simple triggering of an action, for example by means of actuation or tapping, to operation of a service and complex range of functions.

The info region may further be formed in a central region of the graphical user interface in order to be able to offer a particularly suitable display area for info objects.

The info region may serve as a platform that is managed by a system provider, for example. As a result, relevant outputs from other providers, for example advertising partners or service providers, can be incorporated into the operating system in a particularly simple manner. The number of services that can be offered depending on their relevance can be significantly increased as a result.

Furthermore, a fixed format may be provided for content within the info objects, as a result of which, in particular, a personal color and design scheme, a so-called corporate design, can be produced for the operating system. Third-party providers can have their offerings, applications or apps displayed in the info region in their own corporate design (look and feel).

The info region may further be designed as a central display region of the graphical user interface in which relevant functional, operating and information options are provided. In addition, a navigation map may, for example, also be output if this is relevant. The info region may therefore serve as a collection container for content that depends on a current context and a situation. The range of services may be dynamically expanded without having to integrate and operate a large number of individual info applications. This allows for an intelligent, context-sensitive operating system, which significantly simplifies operation.

In other exemplary embodiments, speech operation may take place, wherein the total visual extent of the graphical user interface can beneficially be reduced in size as a result.

Furthermore, information and operating options of mobile devices may be integrated within the graphical user interface, such that a central operating unit is provided. The relevant information is received and control signals, for example in the event of operational actions of the user, are transmitted via interfaces.

The operating system is very open to new applications and is highly scalable. New functions and info applications can be easily integrated in order to accompany the journey with the vehicle in a scenario-based and context-dependent manner.

LIST OF REFERENCE NUMERALS

1 Vehicle
2 Output unit; display
3 Control unit
4 Context detection unit
20 Graphical user interface
21 Display region, widget
22a to 22o Display region, widget
23a to 23g Display region, widget
30 Graphical user interface
31 First display region
32a to 32c Second display region
33 Info region
34 Graphical info object, widget
35 Additional info object, widget
40 Graphical user interface
41 First display region
42 Info region; widget
42a to 42j Info object; sub-widget The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The term "exemplary" used throughout the specification means "serving as an example, instance, or exemplification" and does not mean "preferred" or "having advantages" over other embodiments. The term "in particular" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A method for operating a display in a vehicle, comprising:
    generating and outputting display data of a graphical user interface on an electronic display within the vehicle, the graphical user interface comprising at least one first display region; wherein the graphical user interface comprises a basic state and an info state;
    recording context data about a current context driving situation of the vehicle from one or more environmental sensors of the vehicle;
    determining a first relevance value for a first info application based on the recorded driving situation context data;
    comparing the first relevance value with a predefined relevance threshold value;
    selectively activating the info state depending on the determined first relevance value of the first info application if the first relevance value exceeds the predefined relevance threshold value; wherein,
    when the info state is activated, reducing the first display region in size such that an info region is formed; and
    generating a graphical info object using the first info application and output in the info region.

2. The method of claim 1, wherein the recorded context data comprise one or more of features of the vehicle, an operating state of the vehicle, features of a journey of a user with the vehicle, and user data of the user.

3. The method of claim 1, comprising, when the first display region is reduced in size, generating a sequence of images such that a shift of at least one edge of the first display region is represented.

4. The method of claim 1, wherein
    the graphical user interface further comprises a second display region, which is arranged so as to adjoin the first display region in the basic state of the graphical user interface; wherein,
    when the info state is activated, the info region is formed between the first and the second display region.

5. The method of claim 1, wherein, when the info state is activated, the graphical info object is shifted with a movement from an edge of the info region into the info region.

6. The method of claim 1, comprising
    determining a second relevance value of a second info application; and
    generating a second graphical info object using the second info application; and
    outputting the second graphical info object in the info region; wherein
    a sequence and/or a display duration for the first and second graphical info object is determined depending on a comparison of the first and second relevance value.

7. The method of claim 6, wherein
    the first and second graphical info object are displayed one after the other; wherein
    the first graphical info object is initially displayed; and, subsequently, the second info object is displayed instead of the first info object; wherein
    the first or second info object can be displayed using an operational action.

8. The method of claim 1, wherein
    the first graphical info object comprises a control element;
    an actuation of the control element is detected; and
    an additional info region in which an additional graphical info object is output is formed.

9. A display system for a vehicle, comprising:
    a control circuit, which is configured to generate display data of a graphical user interface comprising at least one first display region;
    an output display, which is configured to output the graphical user interface according to the display data; wherein the graphical user interface is operable in a basic state and an info state;
    one or more environmental sensors of the vehicle;
    and a context detection circuit, which is connected to the one or more environmental sensors of the vehicle and is configured to record context data about a current context driving situation of the vehicle; wherein the control circuit is further configured to determine a first relevance value for a first info application based on the recorded context data;

to determine a first relevance value for a first info application based on the recorded driving situation context data;

to compare the first relevance value with a predefined relevance threshold value; and to selectively activate the info state depending on the determined first relevance value of the first info application if the first relevance value exceeds the predefined relevance threshold value; wherein, when the info state is activated, the first display region is reduced in size such that an info region is formed; and wherein the control circuit is configured to generate a graphical info object using the first info application and to output said graphical info object in the info region.

10. The method of claim 2, comprising, when the first display region is reduced in size, generating a sequence of images such that a shift of at least one edge of the first display region is represented.

11. The method of claim 2, wherein the graphical user interface further comprises a second display region, which is arranged so as to adjoin the first display region in the basic state of the graphical user interface; wherein, when the info state is activated, the info region is formed between the first and the second display region.

12. The method of claim 3, wherein the graphical user interface further comprises a second display region, which is arranged so as to adjoin the first display region in the basic state of the graphical user interface; wherein, when the info state is activated, the info region is formed between the first and the second display region.

13. The method of claim 2, wherein, when the info state is activated, the graphical info object is shifted with a movement from an edge of the info region into the info region.

14. The method of claim 3, wherein, when the info state is activated, the graphical info object is shifted with a movement from an edge of the info region into the info region.

15. The method of claim 4, wherein, when the info state is activated, the graphical info object is shifted with a movement from an edge of the info region into the info region.

* * * * *